United States Patent [19]

Schollhorn

[11] Patent Number: 6,034,201
[45] Date of Patent: Mar. 7, 2000

[54] PROCESS FOR PREPARING UREA-FORMALDEHYDE RESINS

[76] Inventor: Wolf-Dietrich Schollhorn, Jakobstrasse, 29, Grunstadt, Germany

[21] Appl. No.: 09/125,897
[22] PCT Filed: Feb. 19, 1997
[86] PCT No.: PCT/EP97/00805
§ 371 Date: Jan. 15, 1999
§ 102(e) Date: Jan. 15, 1999
[87] PCT Pub. No.: WO97/31957
PCT Pub. Date: Sep. 4, 1997

[30] Foreign Application Priority Data

Feb. 27, 1996 [DE] Germany ............... 196 07 252

[51] Int. Cl.$^7$ .......................... C08G 4/00
[52] U.S. Cl. .................. 528/243; 528/259; 528/266; 528/268; 528/502 R; 528/503
[58] Field of Search ............... 528/243, 254, 528/256, 257, 266, 268, 503, 259, 502 R

[56] References Cited

U.S. PATENT DOCUMENTS 5,010,164   4/1991   Schollhorn .................... 528/243

*Primary Examiner*—Duc Truong
*Attorney, Agent, or Firm*—Staas & Halsey LLP

[57] ABSTRACT

A method of forming a urea formaldehyde resin includes the step of heating solid paraformaldehyde to a temperature of 60 to 120° C. Urea is added to the heated paraformaldehyde to form a urea mixture, which is dry mixed and heated until a temperature of 80 to 110° C. has been reached. After this, a methanolic quanine base is added to the urea mixture to form a quanine-urea-formaldehyde mixture, which is heated until the quanine-urea-formaldehyde mixture is liquefied and cooled to 65° C. Then, the quanine-urea-formaldehyde mixture is heated until it boils, at which point it is condensed for a period of 30 to 100 minutes. After this, additional urea is added to the liquified urea mixture to form a urea enriched mixture. The urea enriched mixture is condensed for 90 to 180 minutes. After condensation, the urea enriched mixture is buffered with lactic acid to form a buffered mixture. This buffered mixture is cooled.

13 Claims, No Drawings

PROCESS FOR PREPARING UREA-FORMALDEHYDE RESINS

BACKGROUND OF THE INVENTION

1. Field of the Invention

This invention relates to a novel method for the manufacture of urea formaldehyde resins as well as these resins themselves.

2. Description of the Related Art

The closest prior art is European Patent 0 319 751, which describes urea formaldehyde resin, its manufacture and use.

claim 1 of European Patent 0 319 751 relates to a strongly exothermically hardening urea formaldehyde resin obtained by the condensation of urea with formaldehyde in an alkaline environment which can be obtained by performing a first Condensation Stage I as follows:

a) Condensation of 0.2 to 0.7, preferably 0.5 Mol urea with 1.2 to 3 Mol, preferably 1.7 to 2.2 Mol formaldehyde in the form of solid paraformaldehyde, in an exclusively alkaline medium, with an initial pH of 8–12, and preferably 9–11.

b) in the presence of 1 to 10 m Mol NaOH and 10 to 80 Mol $NH_3$, or in the presence of 2.5 to 50 m Mol guanine base and 0 to 80 m Mol $NH_3$ per Mol of formaldehyde.

c) at a condensation temperature (I) of 90 to 110 °C.

d) at a condensation period (I) of 10 to 100 minutes, preferably 15 to 70 minutes, followed by a Second Condensation stage II is conducted as follows:

e) admixture of an additional 0.2 to 0.7 Mol, preferably 0.5 Mol urea.

f) at a condensation temperature (I) of 100 to 120° C.

g) for an additional condensation period (II) of 1.5 to 5 hours.

This method of the prior art for the manufacture of strongly exothermically hardening urea formaldehyde resins works in two condensation stages and is well suited for use on a laboratory scale or a small industrial scale, whereby the respective amounts manufactured can be approximately 100 kg.

It has since been found, however, that this method of the prior art cannot be used under industrial conditions, i.e. for batches in the range of tons, or at least not optimally, because the resulting resins cannot always be used for the manufacture of high-quality foam products.

SUMMARY OF THE INVENTION

The object of this invention is therefore to dramatically improve the method described in European Patent 0 319 751 so that it can be used on an industrial scale, and whereby the resins manufactured according to this invention can be used for the manufacture of high-quality foam products in the same manner as those that were obtained on a laboratory or small industrial scale using the method described in European Patent 0 319 751.

The invention teaches the following method for the accomplishment of the object described above:

a) Paraformaldehyde is provided in solid form and is heated to a temperature of 60 to 120° C., preferably to 80 to 100° C.

b) Urea and, if necessary, dicyandiamide and melamine in corresponding molar quantities are added to the heated paraformaldehyde and are intensively dry-mixed and heated until, after approximately 15 minutes, a temperature of 80 to 110° C., preferably 85 to 100° C. has been reached.

c) A 32% methanolic guanine base is added in the corresponding molar ratio to the heated mixture and heated further, whereby within 10 minutes the mixture is liquefied and in spite of the added thermal energy, is cooled to 65° C., and the mixture is heated by the further additional of thermal energy to the boiling range of approximately 103 to 110° C., and is condensed in the first condensation stage, whereby the beginning of the Condensation Period I is arbitrarily set at a temperature of 90° C., and the Condensation Period I is 30 to 100 minutes, preferably 50 to 85 minutes.

d) Following the end of the Condensation Period I, a second quantity of urea, dicyandiamide etc. is added to the boiling mixture in a corresponding molar ratio, and is condensed in a second condensation stage for 90 to 180 minutes at a condensation temperature of 105 to 120° C.

e) Following the end of Condensation Period II, the solution is buffered at boiling heat with lactic acid, and the resin is cooled for approximately 120 minutes to approximately 25 ° C.

The molar quantities used theoretically are the same as in the reference cited by the closest prior art, which is European Patent 0 319 780.

DETAILED DESCRIPTION OF THE PREFERRED EMBODIMENT

The essence of this invention is explained in greater detail below on the basis of the following exemplary embodiments which represent the preferred embodiments.

Exemplary Embodiment I 1) 482 kg of paraformaldehyde is heated to 90° C.

2) 250 kg of urea and 30 kg of dicyandiamide are added and intensively mixed with the paraformaldehyde, and heated for 15 minutes to approximately 90° C.

3) 24 kg of 32% methanolic guanine base is added and intensively mixed. The temperature drops to approximately 65° C.

4) When a temperature of 90° C. is reached, the Condensation Period I begins, boiling range approximately 10.

5) 250 kg of urea is added after the end of Condensation Period I, namely 75 minutes, and dissolved. The temperature drops to approximately 90 ° C. The Condensation Period II, namely 120 minutes, begins upon the addition of the urea. A boiling range of approximately 114 to 110° C. is reached. Condensation Period II is 120 minutes.

6) 3.43 kg of 85% lactic acid is required for buffering in the boiling heat

7) Cooling of the resin for approximately 120 minutes to approximately 25° C.

The resulting resin has a viscosity of 240 dPas at 25° C. The reactivity is 43 ° C.

Exemplary Embodiment II 1) 675 kg of paraformaldehyde is heated to 90 ° C.

2) 350 kg of urea and dicyandiamide are added and intensively mixed with the paraformaldehyde, and heated for 15 minutes to approximately 90° C.

3) 33.6 kg of 32% methanolic guanine base is added and intensively mixed. The temperature drops to approximately 65° C.

4) The Condensation Period I of 75 minutes begins when a temperature of 90° C. is reached. The boiling range is from 107 to 103° C.

5) 360 kg of urea is added and dissolved after Condensation Period I. The temperature drops to approximately 90° C. Condensation Period II begins after the addition of the urea and lasts 120 minutes at a condensation temperature of 114 to 110° C.

6) 4.8 kg of 85% lactic acid is required for buffering in the boiling heat.

7) Cooling of the resin for approximately 120 minutes to approximately 25° C.

The resin has a viscosity of 145 dPas at 25° C. The reactivity is 42° C.

The reactivity is measured in the same manner as described in European Patent 0 139 751 [sic]

The resins manufactured using the method claimed by the invention are well suited for the manufacture of high-quality foams, as described in European Patent 0 319 751.

These products can also be processed as described in this European Patent 0 319 751.

I claim:

1. A method of forming a urea formaldehyde resin comprising the steps of:
   a) heating solid paraformaldehyde to a temperature of 60 to 120° C.;
   b) adding urea to the heated paraformaldehyde to form a urea mixture and dry-mixing and heating the urea mixture until a temperaature of 80 to 110° C. has been reached;
   c) after step (b), adding a methanolic quanine base to the urea mixture to form a quanine-urea-formaldehyde mixture and heating until the quanine-urea-formaldehyde mixture is liquefied and cooled to 65° C., and then heating the quanine-urea-formaldehyde mixture until it boils, and then condensing the quanine-urea-formaldehyde mixture for a period of 30 to 100 minutes;
   d) after step (c), adding additional urea to the quanine-urea-formaldehyde mixture to form a urea enriched mixture, and then condensing the urea enriched mixture for 90 to 180 minutes; and
   e) after step (d), buffering the urea enriched mixture with lactic acid to form a buffered mixture, and then cooling the buffered mixture.

2. A method of forming a urea formaldehyde resin according to claim 1, wherein the solid paraformaldehyde is heated to a temperature of 80–100° C.

3. A method of forming a urea formaldehyde resin according to claim 1, wherein dicyandiamine and melamine are added in step (b).

4. A method of forming a urea formaldehyde resin according to claim 1, wherein a 32% methanolic quanine base is used in step (c).

5. A method of forming a urea formaldehyde resin according to claim 1, wherein condensation is started in step (c) when the temperature of the quanine-urea-formaldehyde mixture reaches 90° C.

6. A method of forming a urea formaldehyde resin according to claim 1, wherein the quanine-urea-formaldehyde mixture is condensed in step (c) for a period of 50 to 85 minutes.

7. A method of forming a urea formaldehyde resin according to claim 1, wherein the boiling point of the quanine-urea-formaldehyde mixture in step (c) is approximately 103 to 110° C.

8. A method of forming a urea formaldehyde resin according to claim 1, wherein urea is added in step (d) while the quanine-urea-formaldehyde mixture is boiling.

9. A method of forming a urea formaldehyde resin according to claim 1, wherein dicyandiamine is added in step (d).

10. A method of forming a urea formaldehyde resin according to claim 1, wherein the urea enriched mixture is condensed at a temperature of 105 to 120° C. in step (d).

11. A method of forming a urea formaldehyde resin according to claim 1, wherein the buffered urea mixture is cooled in step (e) for approximately 120 minutes.

12. A method of forming a urea formaldehyde resin according to claim 1, wherein the buffered urea mixture is cooled in step (e) to approximately 25° C.

13. A method of forming a urea formaldehyde resin by the condensation of urea with formaldehyde resin, comprising the steps of:
   (a) heating solid paraformaldehyde to a temperature of 60 to 120° C.;
   (b) adding urea, dicyandiamide and melamine in corresponding molar quantities to the heated paraformaldehyde to form a urea mixture;
   (c) intensively dry-mixing and heating the urea mixture for approximately 15 minutes until a temperature of 80 to 110° C. has been reached;
   (d) after step (c), adding a methanolic quanine base in the corresponding molar ratio to the urea mixture to form a quanine-urea-formaldehyde mixture and heating for approximately 10 minutes until the quanine-urea-formaldehyde mixture is liquefied and cooled to 65° C.;
   (e) after step (d), heating the quanine-urea-formaldehyde mixture further to approximately 103 to 110° C., until it boils;
   (f) when the temperature of the quanine-urea-formaldehyde mixture reaches 90° C. in step (e), condensing the quanine-urea-formaldehyde mixture for a period of 30 to 100 minutes;
   (g) after step (f), adding additional urea and dicyandiamide in a corresponding molar ratio to the quanine-urea-formaldehyde mixture while it is boiling to form a urea enriched mixture;
   (h) condensing the urea enriched mixture for 90 to 180 minutes at a condensation temperature of 105 to 120° C.;
   (i) after step (h), buffering the urea enriched mixture with lactic acid to form a buffered mixture; and
   (j) cooling the buffered mixture for approximately 120 minutes, to reach a temperature of approximately 25° C.

* * * * *